(12) United States Patent
Bang et al.

(10) Patent No.: US 9,041,350 B2
(45) Date of Patent: *May 26, 2015

(54) BATTERY PACK HAVING IMPROVED STRENGTH

(75) Inventors: Seunghyun Bang, Chungcheongbuk-do (KR); Soo Ryoung Kim, Chungcheongbuk-do (KR); Youngsun Park, Cheongju-si (KR); Chunyeon Kim, Chungcheongbuk-do (KR); Ho Sang Kwon, Cheongju-si (KR)

(73) Assignee: LG CHEM, LTD., Seoul (KR)

( * ) Notice: Subject to any disclaimer, the term of this patent is extended or adjusted under 35 U.S.C. 154(b) by 366 days.

This patent is subject to a terminal disclaimer.

(21) Appl. No.: 13/515,299

(22) PCT Filed: Dec. 20, 2010

(86) PCT No.: PCT/KR2010/009114
§ 371 (c)(1),
(2), (4) Date: Jun. 28, 2012

(87) PCT Pub. No.: WO2011/078536
PCT Pub. Date: Jun. 30, 2011

(65) Prior Publication Data
US 2012/0257349 A1 Oct. 11, 2012

(30) Foreign Application Priority Data

Dec. 22, 2009 (KR) .................. 10-2009-0129092

(51) Int. Cl.
*H02J 7/00* (2006.01)
*H01M 2/10* (2006.01)
(Continued)

(52) U.S. Cl.
CPC .......... *H01M 2/1061* (2013.01); *H01M 2/0275* (2013.01); *H01M 2/30* (2013.01); *H01M 10/425* (2013.01)

(58) Field of Classification Search
CPC ............ H02J 7/00; H01M 2/10; H01M 2/30; H01M 2/0275; H01M 2/1061; H01M 10/425
USPC .......................... 320/112, 113, 114; 429/100
See application file for complete search history.

(56) References Cited

U.S. PATENT DOCUMENTS 4,361,981 A * 12/1982 Reiling et al. ................. 446/219
4,591,692 A * 5/1986 Wightman .................... 219/209

(Continued)

FOREIGN PATENT DOCUMENTS

CM 1442912 A 9/2003
CN 1753206 A 3/2006

(Continued)

OTHER PUBLICATIONS

Wikipedia (http://en.wikipedia.org/wki/Nomex, printed Oct. 24, 2014, pp. 1-4).*

(Continued)

*Primary Examiner* — Phallaka Kik
(74) *Attorney, Agent, or Firm* — Birch, Stewart, Kolasch & Birch, LLP

(57) ABSTRACT

Disclosed herein is a battery pack including a battery cell array including two or more battery cells, each of which has an electrode assembly of a cathode/separator/anode structure disposed in a battery case together with an electrolyte in a sealed state, arranged in a lateral direction, a protection circuit module (PCM) connected to an upper end of the battery cell array to control an operation of the battery pack, a pack case in which the battery cell array and the protection circuit module are disposed, and a plate-shaped reinforcing member mounted between the pack case and the battery cell array to increase mechanical strength of the pack case.

18 Claims, 12 Drawing Sheets

(51) Int. Cl.
*H01M 2/30* (2006.01)
*H01M 10/42* (2006.01)
*H01M 2/02* (2006.01)

(56) References Cited

U.S. PATENT DOCUMENTS

| | | | |
|---|---|---|---|
| 5,601,942 A | 2/1997 | Fedele | |
| 6,068,946 A | 5/2000 | Zedell, Jr. et al. | |
| 6,224,997 B1* | 5/2001 | Papadopoulos | 429/99 |
| 8,691,412 B2* | 4/2014 | Yonishi | 429/100 |
| 2003/0211382 A1 | 11/2003 | Aoyama | |
| 2006/0006837 A1* | 1/2006 | Ogura et al. | 320/112 |
| 2006/0099503 A1 | 5/2006 | Lee | |
| 2006/0244416 A1* | 11/2006 | Yong et al. | 320/112 |
| 2008/0176131 A1* | 7/2008 | Byun et al. | 429/122 |
| 2008/0206628 A1* | 8/2008 | Honbou | 429/94 |
| 2008/0257624 A1* | 10/2008 | Kubo | 180/68.1 |
| 2008/0286641 A1* | 11/2008 | Yonishi | 429/100 |
| 2009/0148759 A1* | 6/2009 | Mitsuda et al. | 429/142 |
| 2009/0220853 A1* | 9/2009 | Yang et al. | 429/159 |
| 2011/0097623 A1* | 4/2011 | Marinis et al. | 429/163 |
| 2011/0143176 A1* | 6/2011 | Otohata et al. | 429/53 |
| 2012/0257349 A1* | 10/2012 | Bang et al. | 361/679.55 |
| 2012/0300396 A1* | 11/2012 | Bang et al. | 361/679.55 |
| 2013/0004799 A1* | 1/2013 | Bang et al. | 429/7 |
| 2013/0157084 A1* | 6/2013 | Bang et al. | 429/7 |
| 2013/0157085 A1* | 6/2013 | Bang et al. | 429/7 |
| 2013/0164570 A1* | 6/2013 | Bang et al. | 429/7 |

FOREIGN PATENT DOCUMENTS

| | | |
|---|---|---|
| CN | 1765558 A | 5/2006 |
| JP | 2001-266820 A | 9/2001 |
| JP | 2002-124233 A | 4/2002 |
| JP | 2002-245997 A | 8/2002 |
| JP | 2004-139924 A | 5/2004 |
| JP | 2004-356027 A | 12/2004 |
| JP | 2005-166570 A | 6/2005 |
| JP | 2007-335309 A | 12/2007 |
| JP | 2008-192447 A | 8/2008 |
| JP | 2008-532223 A | 8/2008 |

OTHER PUBLICATIONS

International Search Report issued in PCT/KR2010/009114, mailed on Aug. 19, 2011.

* cited by examiner

BATTERY PACK HAVING IMPROVED STRENGTH

TECHNICAL FIELD

The present invention relates to a battery pack having improved strength, and, more particularly, to a battery pack including a battery cell array including two or more battery cells arranged in a lateral direction, a protection circuit module (PCM) connected to an upper end of the battery cell array to control an operation of the battery pack, a pack case in which the battery cell array and the protection circuit module are disposed, and a plate-shaped reinforcing member mounted between the pack case and the battery cell array to increase mechanical strength of the pack case.

BACKGROUND ART

Various kinds of combustible materials are contained in a lithium secondary battery. As a result, the lithium secondary battery may be heated or explode due to the overcharge of the lithium secondary battery, the overcurrent in the lithium secondary battery, or other physical external impact applied to the lithium secondary battery. That is, the safety of the lithium secondary battery is very low. Consequently, safety elements, such as a positive temperature coefficient (PTC) element and a protection circuit module (PCM), to effectively control an abnormal state of the lithium secondary battery, such as the overcharge of the lithium secondary battery or the overcurrent in the lithium secondary battery, are disposed on a battery cell in a state in which the safety elements are connected to the battery cell.

Meanwhile, a plurality of battery cells may be encased to manufacture a battery pack using the following three methods.

In a first method, the battery cells are encased in a plastic case. This method is suitable for an external battery pack, which is exposed outward after the battery pack is mounted in a laptop computer or a mobile phone. However, this method has problems in that a thin polymer battery pack exhibits relatively low solidity and, in particular, needle type objects may easily penetrate the battery pack.

In a second method, the battery cells are encased in an insulative tape. This method is suitable for a structure in which a battery pack is mounted in a laptop computer or a mobile phone and is then encased in a plastic case since the battery cells are encased in the insulative tape and thus exhibits low mechanical strength. A battery pack manufactured through this process may be referred to as an inner pack or an embedded pack. However, this method has problems in that it is not suitable for an external battery pack since the insulative tape constitutes a sheathing member.

In a third method, the battery cells are encased in a metal case. This method is suitable for an external battery pack, which is exposed outward after the battery pack is mounted in a laptop computer or a mobile phone. This method is relatively advantageous in that needle type objects cannot easily penetrate the battery pack. However, the metal case increases the weight of the battery pack, and it is relatively difficult to realize products having complex shapes. Also, an upper case and a lower case are generally assembled using bolts with the result that the number of assembly processes is increased.

Therefore, there is a high necessity for a battery pack having a specific structure that is capable of solving the above-mentioned problems. Specifically, it is necessary to provide a battery pack, in which a plastic case is used, having a specific structure to increase mechanical strength, such as looseness, solidity and bending, and to prevent needle type objects from penetrating the battery pack.

Meanwhile, a battery pack mounted in a laptop computer requires high power and large capacity. To this end, a conventional cylindrical battery pack including a plurality of cylindrical battery cells has been used. In recent years, however, the size of a laptop computer has been reduced, and therefore, there is a high necessity for a slim type battery pack.

Therefore, there is a high necessity for a technology that is capable of using pouch-shaped battery cells to manufacture a slim type battery pack, thereby increasing capacity, and, at the same time, providing a reinforcing member between a pack case and the battery cells, thereby increasing mechanical strength of the pack case.

DISCLOSURE

Technical Problem

Therefore, the present invention has been made to solve the above problems, and other technical problems that have yet to be resolved.

Specifically, it is an object of the present invention to provide a battery pack including two or more battery cells to provide high power or large capacity and a reinforcing member disposed between a pack case and a battery cell array, thereby increasing mechanical strength of the pack case.

It is another object of the present invention to provide a large-capacity battery pack which is manufactured using a simple and easy method and a manufacturing process of which is simplified, thereby reducing manufacturing costs.

Technical Solution

In accordance with one aspect of the present invention, the above and other objects can be accomplished by the provision of a battery pack including (a) a battery cell array including two or more battery cells, each of which has an electrode assembly of a cathode/separator/anode structure disposed in a battery case together with an electrolyte in a sealed state, arranged in a lateral direction, (b) a protection circuit module (PCM) connected to an upper end of the battery cell array to control an operation of the battery pack, (c) a pack case in which the battery cell array and the protection circuit module are disposed, and (d) a plate-shaped reinforcing member mounted between the pack case and the battery cell array to increase mechanical strength of the pack case.

That is, in the battery pack according to the present invention, the battery cells are arranged in the lateral direction based on desired capacity of the battery pack, and the plate-shaped reinforcing member is disposed between the pack case and the battery cell array, thereby increasing mechanical strength of the pack case.

Consequently, it is possible to minimize the increase in total weight and size of the battery pack, to minimize damage to the battery pack when external force is applied to the battery pack, and to effectively prevent the battery pack from catching fire due to needle type objects penetrating the battery pack.

In a preferred example, the pack case may be formed of a plastic material or a sheet member, and the reinforcing member may be formed of stainless steel (SUS) or a thin metal sheet.

Although the pack case is formed of the plastic material or the sheet member, which exhibits low mechanical strength, therefore, it is possible to increase mechanical strength of the battery pack through the use of the reinforcing member formed of the stainless steel (SUS) or the thin metal sheet.

Also, the pack case may reduce the weight of the battery pack, and it is possible to easily realize products having complex shapes through the use of the pack case, as compared with a metal pack case.

The sheet member may wrap the battery cell array, the protection circuit module, and the reinforcing member.

That is, the battery pack may be configured so that the reinforcing member is placed at the top of the battery cell array, the battery cell array, the protection circuit module, and the reinforcing member are wrapped with the sheet member instead of a plastic case.

The sheet member may be formed of, preferably, a Nomex material. For reference, Nomex is a trademark of a product manufactured and sold by E.I. du Pont de Nemours and Company.

In a preferred example, the reinforcing member may be coated with an insulative material to achieve insulation between the reinforcing member and the battery cell array since the reinforcing member is formed of stainless steel or a thin metal sheet as described above.

In another preferred example, the reinforcing member may be bonded to the top and bottom of the battery cell array by an adhesive or a double-sided adhesive tape, and therefore, it is possible to prevent the reinforcing member from moving out of position.

Preferably, the reinforcing member is provided at a part of the outer circumference thereof with a side wall having a size corresponding to a height of the battery cell array to prevent movement of the battery cell array. The side wall prevents the battery cell array from moving out of position during assembly of the battery pack and from moving after assembly of the battery pack.

In the above structure, the side wall may extend upward and/or downward from opposite sides and the lower end of the reinforcing member.

Specifically, the side wall of the reinforcing member attached to the bottom of the battery cell array may extend upward from opposite sides and the lower end of the reinforcing member, and the side wall of the reinforcing member attached to the top of the battery cell array may extend downward from opposite sides and the lower end of the reinforcing member.

According to circumstances, a movement preventing protrusion to prevent movement of the reinforcing member and to fix the reinforcing member in place may be formed at the inside of the pack case at a position of the pack case corresponding to the end of the reinforcing member.

The shape or structure of the movement preventing protrusion is not particularly restricted so long as the movement preventing protrusion can prevent movement of the reinforcing member. For example, a wall, rib or projection may be continuously or discontinuously formed at the side of the pack case.

Meanwhile, the protection circuit module may be configured to have a structure including connection terminals connected to electrode terminals of the battery cells by resistance welding, metal plates to electrically connect the battery cells to each other, and a protection circuit to control the operation of the battery pack.

In a preferred example of the above-mentioned structure, metal wires to electrically connect the battery cells to each other may be formed at the top of the protection circuit module. In this structure, it is possible to easily manufacture the PCM and to easily assemble the battery pack as compared with a structure in which metal wires are formed at a layer in the protection circuit of the PCM so as to electrically connect battery cells to each other.

The battery cells may be selectively connected in series or in parallel to each other based on desired power and capacity of an external device in which the battery pack according to the present invention is installed. For example, the battery cells may be connected in parallel to each other if it is necessary for the battery cells to provide large capacity for a long time. On the other hand, the battery cells may be connected in series to each other if it is necessary for the battery cells to provide high power for a short time.

In another preferred example of the above-mentioned structure, electrical connection regions between cathode terminals of the battery cells and the protection circuit module may be configured to have a structure in which conductive plates attached to the tops of the respective connection terminals of the protection circuit module are welded so that the conductive plates wrap the respective cathode terminals of the battery cells.

In the battery pack with the above-stated construction, therefore, the connection terminals of the protection circuit module and the electrode terminals of the battery cells are connected to each other via the conductive plates, which are configured to have a specific structure, and the battery cells are electrically connected in series and/or in parallel to each other via the metal plates included in the protection circuit module. Consequently, it is possible to easily manufacture a large-capacity, high-power battery pack through the use of a simple method.

For example, in a case in which a battery pack is constituted by three battery cells, the battery cells are arranged in the lateral direction to constitute a battery cell array, the battery cell array and a PCM are disposed at a pack case, and electrode terminals of the battery cells and connection terminals of the PCM are connected to each other by resistance welding, thereby manufacturing a desired battery pack.

Also, in a state in which the electrode terminals of the battery cell array are welded to the connection terminals of the PCM, the metal plates in the PCM are connected in series to each other to provide a battery pack providing high power, or metal plates in the PCM are connected in parallel to each other to provide a battery pack that can be used for a long time. In this way, it is possible to selectively manufacture a desired battery pack based on needs and uses.

Specifically, the conductive plates are attached to the connection terminals of the protection circuit module so that the conductive plates can be bent, the conductive plates are bent in a bracket shape in a state in which the cathode terminals of the battery cells are placed on the conductive plates, and resistance welding is carried out from above the bent portions of the conductive plates, thereby achieving physical coupling and electrical connection between the connection terminals of the protection circuit module and the cathode terminals of the battery cells.

The shape of the conductive plates is not particularly restricted so long as the conductive plates can be easily bent. For example, the conductive plates may be formed in an L shape in a state in which the conductive plates are attached to the corresponding connection terminals of the protection circuit module.

Each of the conductive plates may include a first connection part attached to the top of a corresponding one of the connection terminals of the protection circuit module and a second connection part attached to the top of the cathode terminal of a corresponding one of the battery cells. Consequently, the connection between the cathode terminals of the battery cells and the connection terminals of the protection circuit module is more securely achieved. When external force is applied to the battery pack, deformation of the electrical connection regions between the cathode terminals of the battery cells and the protection circuit module is prevented.

The material composing each of the conductive plates is not particularly restricted so long as the conductive plates can provide high coupling force when the conductive plates are welded as described above. Preferably, each of the conductive plates is a nickel plate, and each of the cathode terminals of the battery cells is an aluminum terminal.

Consequently, electric current from a resistance welding rod during resistance welding between the nickel plate and the aluminum terminal flows from the nickel plate, resistance of which is high, to the aluminum terminal, resistance of which is low, with the result that the resistance welding between the nickel plate and the aluminum terminal is easily achieved.

Preferably, the pack case includes a lower case at which the battery cell array and the protection circuit module are disposed and an upper case to cover the lower case so as to fix the battery cell array and the protection circuit module in place.

The lower case may be partitioned into a battery cell mounting part, at which the battery cells are disposed, and a protection circuit module mounting part, at which the protection circuit module is disposed, and a partition wall may be formed at the interface between the battery cell mounting part and the protection circuit module mounting part. Also, openings, through which electrode terminals of the battery cells are exposed toward the protection circuit module, may be formed at portions of the partition wall corresponding to electrical connection regions between the electrode terminals of the battery cells and the protection circuit module.

In this pack case structure, it is possible to restrain contact between the electrode terminals of the battery cells and the parts of the protection circuit module since the partition wall is formed at the interface between the battery cell mounting part and the protection circuit module mounting part. Also, even when an electrolyte leaks from one or more of the battery cells, the electrolyte is prevented from flowing to the protection circuit module, thereby preventing the occurrence of a short circuit.

Also, since the openings, through which electrode terminals of the battery cells are exposed toward the protection circuit module, are formed at portions of the partition wall corresponding to the electrical connection regions between the electrode terminals of the battery cells and the protection circuit module, it is possible to easily weld the electrode terminals of the battery cells, which are exposed through the openings, to the connection terminals of the protection circuit module.

The height of the partition wall may be sufficient to fully isolate the battery cell mounting part and the protection circuit module from each other.

The protection circuit module mounting part may be configured to have a structure including support parts to support the electrical connection regions between the electrode terminals of the battery cells and the protection circuit module.

The shape of the support parts is not particularly restricted so long as the support parts can easily support the electrical connection regions between the electrode terminals of the battery cells and the protection circuit module. For example, the support parts may be formed on the lower case in the shape of an upward cross-shaped protrusion.

Since the support parts are formed in the shape of a cross-shaped protrusion, it is possible for the support parts to more stably support the electrical connection regions between the electrode terminals of the battery cells and the protection circuit module during resistance welding between the electrode terminals of the battery cells and the protection circuit module.

The battery cell array may be configured by arranging a plurality of battery cells in the lateral direction based on desired capacity of the battery pack as previously described. For example, in a device, such as a laptop computer, three battery cells are preferably used to constitute a battery pack since the device requires long-term use and portability.

In the battery pack according to the present invention, any battery cells may be used in various manners irrespective of the kind and shape of the battery cells. A pouch-shaped secondary battery, preferably a pouch-shaped lithium secondary battery, is preferably used as each battery cell of the battery pack.

According to circumstances, the external input and output terminals, which input electric current to the battery pack, output electric current from the battery pack, and transmit and receive information, may be mounted at the front of the protection circuit module in a depressed form.

In this structure, the battery pack can be stably connected to an external device through the external input and output terminals since the external input and output terminals are configured to have a connector structure.

In accordance with another aspect of the present invention, there is provided a laptop computer including the battery pack with the above-stated construction as a power source.

However, the battery pack according to the present invention may be manufactured so as to provide power and capacity required by a device, in which the battery pack will be installed, by varying the number of battery cells constituting the battery pack. Of course, therefore, the battery pack according to the present invention can be applied to various devices requiring variable battery capacities.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
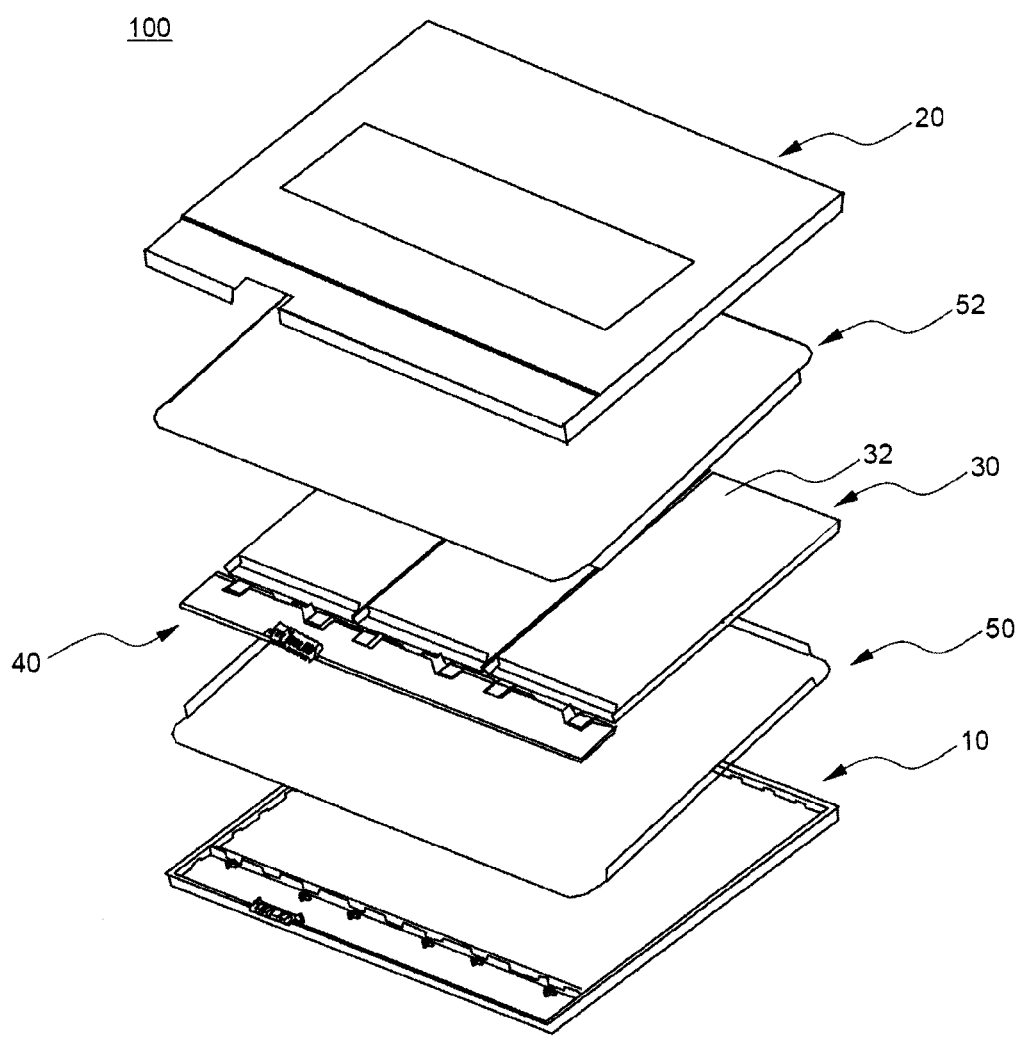
FIG. 1 is an exploded view showing a battery pack according to an embodiment of the present invention.

FIG. 1 is an exploded view typically showing a battery pack according to an embodiment of the present invention.

Referring to FIG. 1, a battery pack 100 includes a battery cell array 30 including three battery cells 32 arranged in the lateral direction, a protection circuit module 40 connected to the upper end of the battery cell array 30, pack cases 10 and 20 between which the battery cell array 30 and the protection circuit module 40 are disposed, and reinforcing members 50 and 52 mounted between the pack case 10 and the battery cell array 30 and between the pack case 20 and the battery cell array 30, respectively.

Each of the battery cells 32 is a pouch-shaped secondary battery cell configured so that an electrode assembly having a cathode/separator/anode structure is disposed in a battery case together with an electrolyte in a sealed state. Each of the battery cells 32 is generally configured to have a plate-shaped structure.

The pack cases include a lower case 10 to which the battery cell array 30 and the protection circuit module 40 are mounted and an upper case 20 disposed above the lower case 10 to fix the battery cell array 30 and the protection circuit module 40 in place.

Also, the upper case 20 and the lower case 10 are formed of a plastic material. The reinforcing members 50 and 52 are formed of stainless steel.

Figure 2:
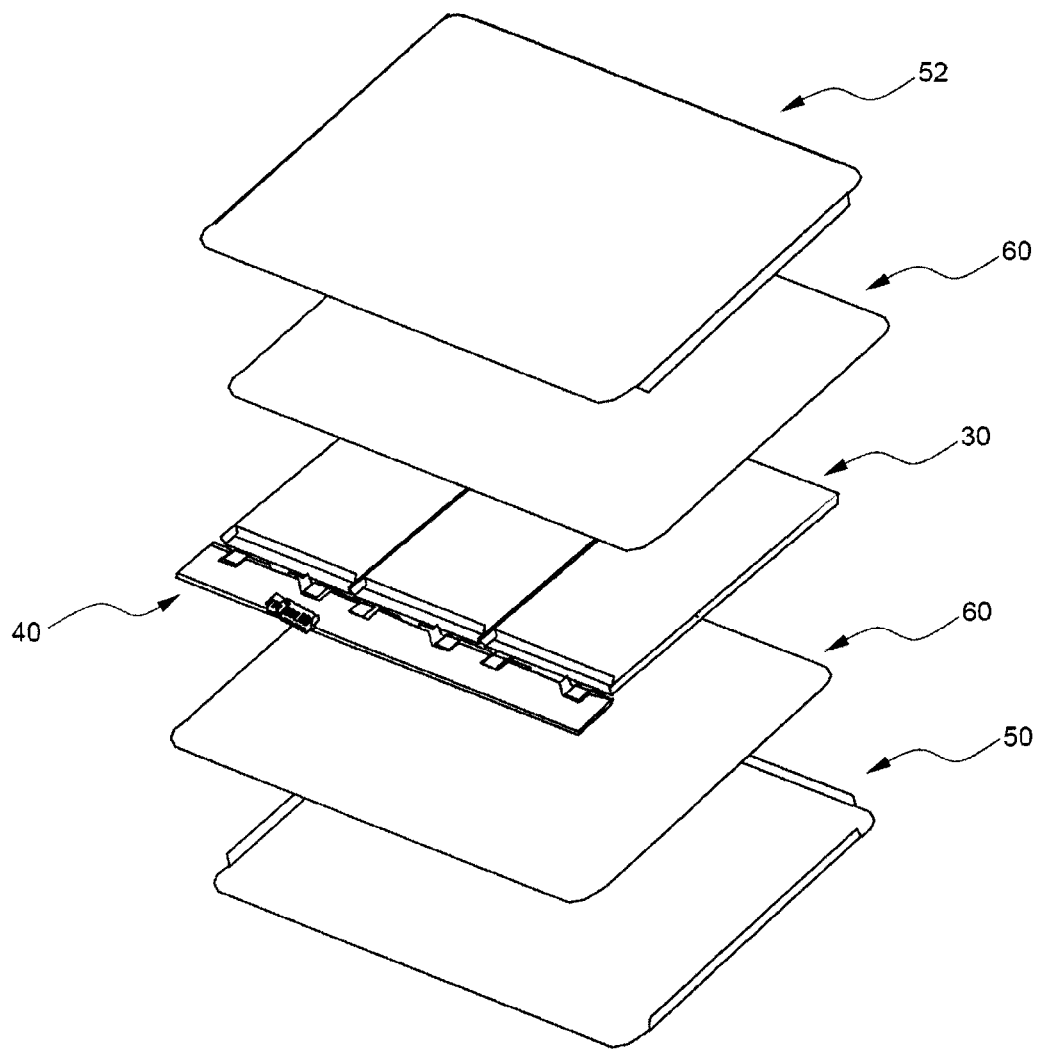
FIG. 2 is an exploded view showing a battery pack according to another embodiment of the present invention.
Figure 3:
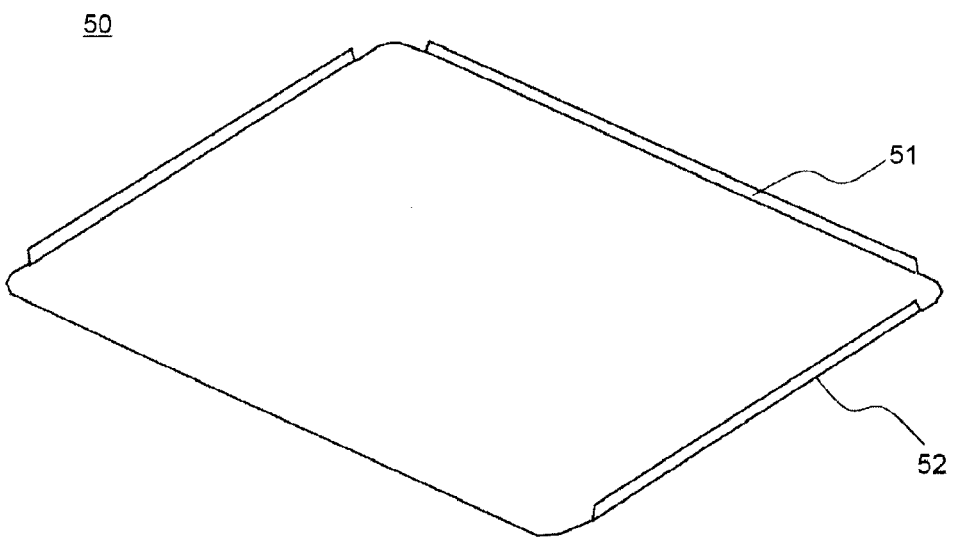
FIG. 3 is an enlarged view typically showing a reinforcing member of FIG. 1.

FIG. 2 is an exploded view typically showing a battery pack according to another embodiment of the present invention, and FIG. 3 is an enlarged view typically showing one of the reinforcing members of FIG. 1.

Referring to these drawings, the reinforcing member 50 is provided at a part of the outer circumference thereof with a side wall having a size corresponding to the height of the battery cell array 30 to prevent movement of the battery cell array 30.

The reinforcing members includes a first reinforcing member 50 extending upward from opposite sides 52 and the lower end 51 thereof and a second reinforcing member 52 extending downward from opposite sides 52 and the lower end 51 thereof The first reinforcing member 50 is bonded to the bottom of the battery cell array 30 by a double-sided adhesive tape 60, and the second reinforcing member 52 is attached to the top of the battery cell array 30 by a double-sided adhesive tape 60.

Figure 4:
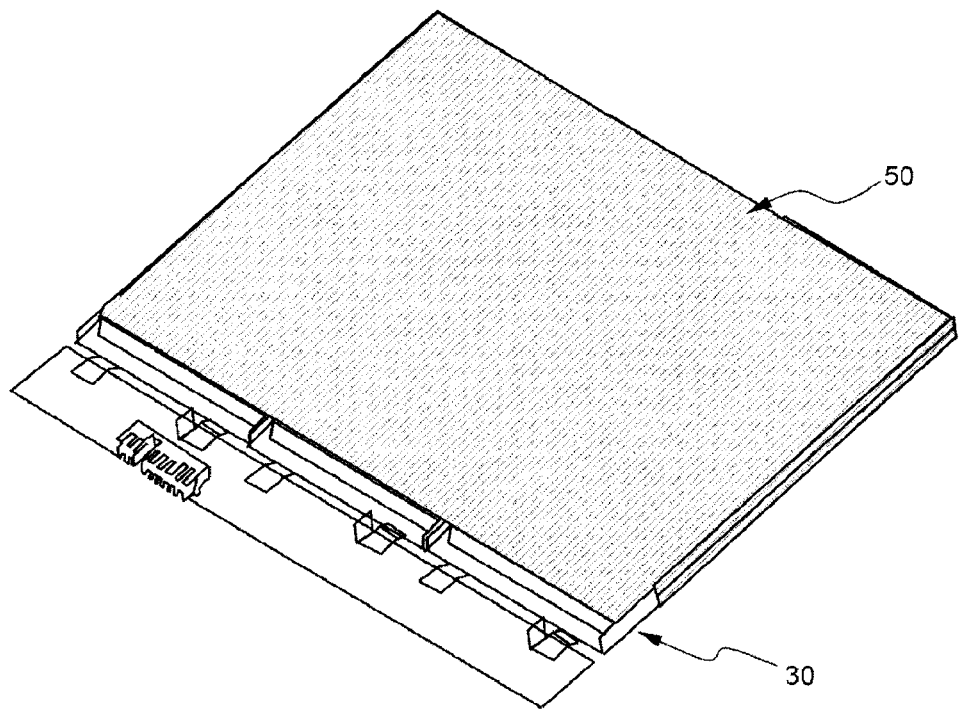
FIG. 4 is a perspective view showing a structure in which the reinforcing member is mounted to the upper end of a battery cell array.

FIG. 4 is a perspective view typically showing a structure in which the reinforcing member is mounted to the upper end of the battery cell array. Referring to FIG. 4, at least the bottom of the reinforcing member 50 is coated with an insulative material to achieve insulation between the reinforcing member 50 and the battery cell array 30.

Figure 5:
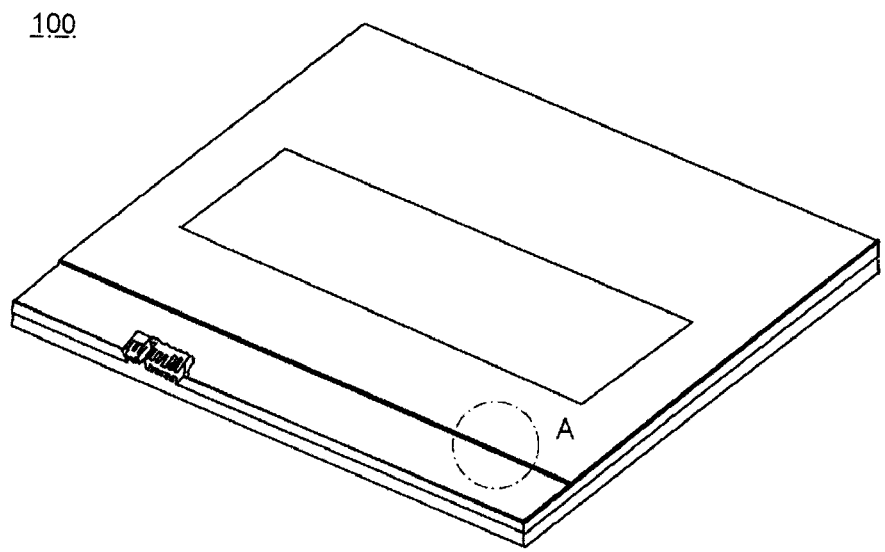
FIG. 5 is an assembled perspective view showing the battery pack of FIG. 1.
Figure 6:
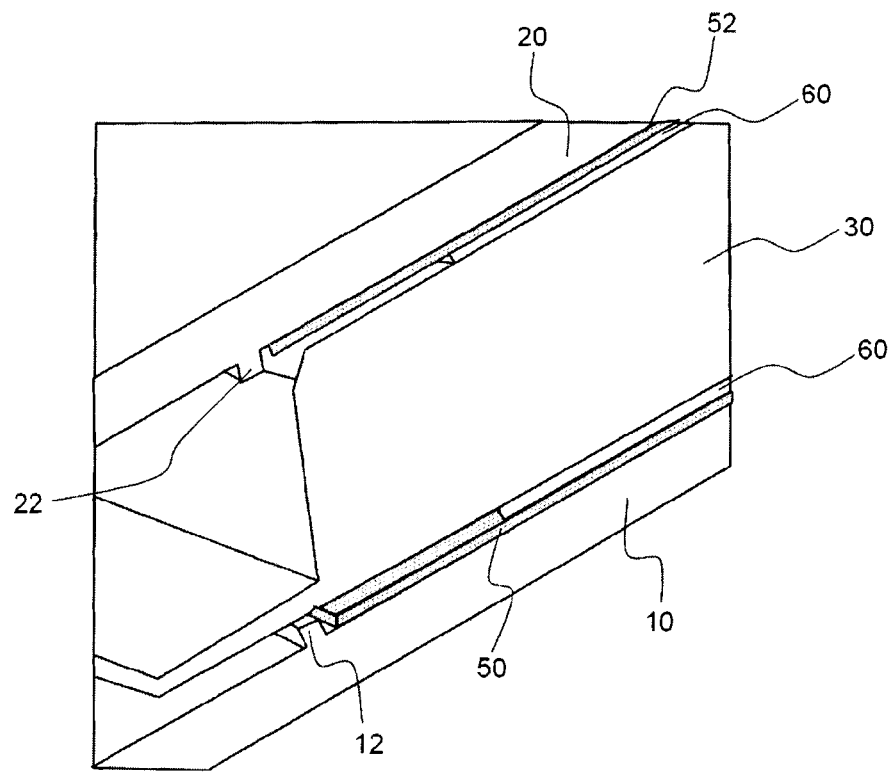
FIG. 6 is a vertical sectional view of a region A of FIG. 5 showing the interior of the battery pack in an enlarged state.

FIG. 5 is an assembled perspective view typically showing the battery pack of FIG. 1, and FIG. 6 is a vertical sectional view of a region A of FIG. 5 typically showing the interior of the battery pack in an enlarged state.

Referring to these drawings, movement preventing protrusions 12 and 22 to prevent movement of the first reinforcing member 50 and the second reinforcing member 52 and to fix the first reinforcing member 50 and the second reinforcing member 52 in place are formed at the insides of the lower case 10 and the upper case 20 at positions of the lower case 10 and the upper case 20 corresponding to ends of the first reinforcing member 50 and the second reinforcing member 52 in the shape of a partition wall, respectively.

Figure 7:
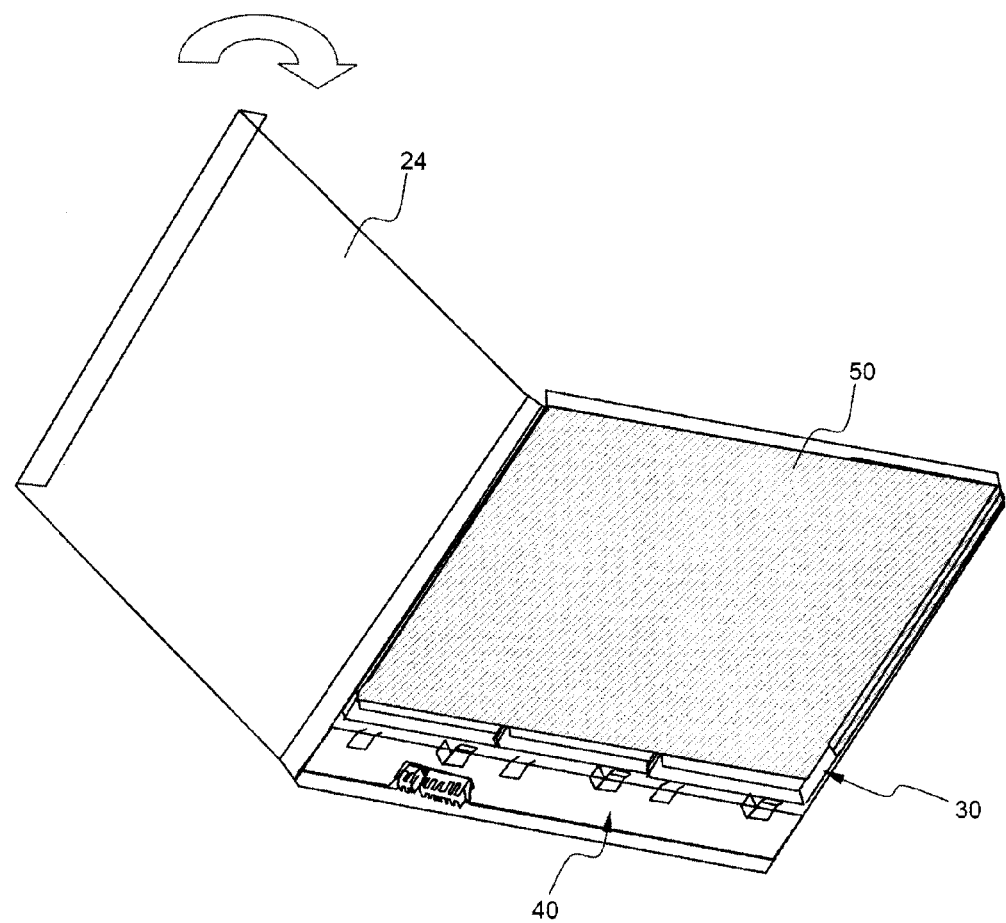
FIG. 7 is a perspective view showing a battery pack according to a further embodiment of the present invention.

FIG. 7 is a perspective view typically showing a battery pack according to a further embodiment of the present invention. Referring to FIG. 7, a sheet member 24, formed of a Nomex material, wraps the battery cell array 30, the protection circuit module 40, and the reinforcing member 50.

Figure 8:
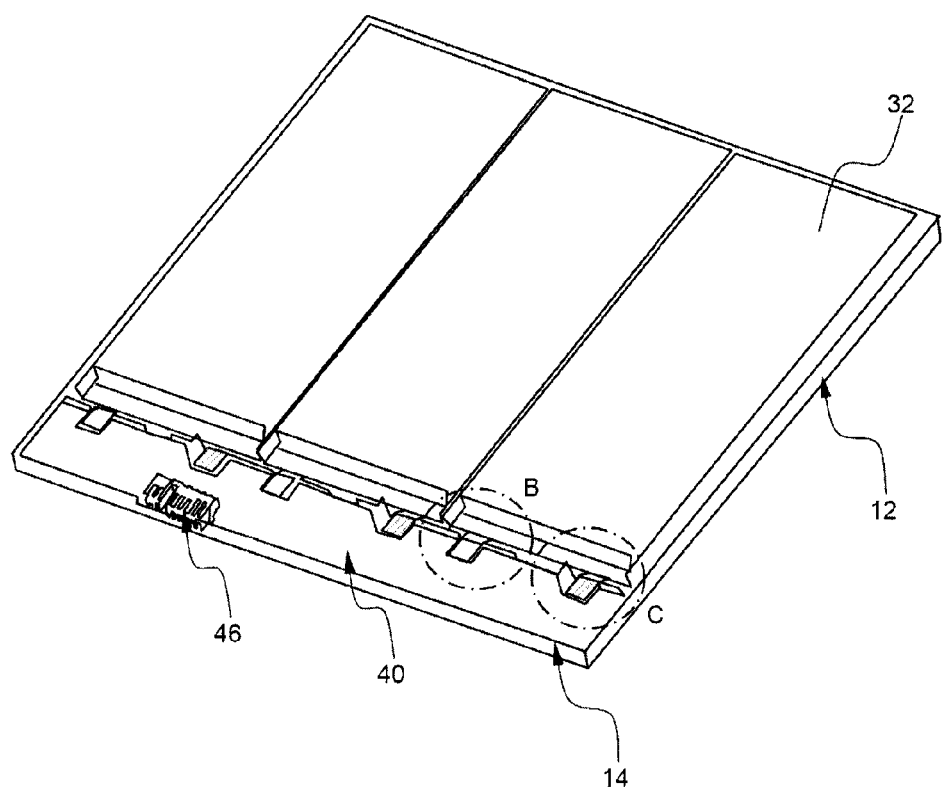
FIG. 8 is a perspective view showing a structure in which a battery cell array and a protection circuit module are mounted to a lower case.
Figure 9:
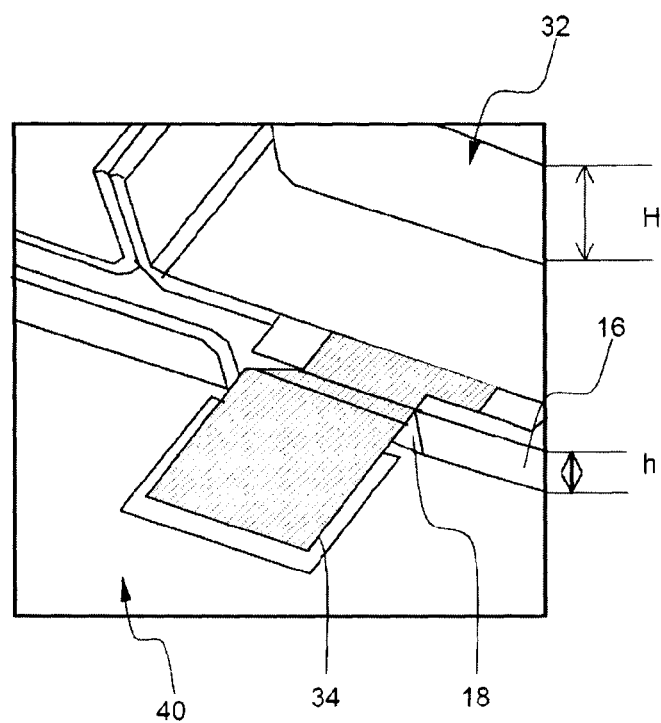
FIG. 9 is an enlarged view typically showing a region B of FIG. 8.

FIG. 8 is a perspective view typically showing a structure in which the battery cell array and the protection circuit module are mounted to the lower case, and FIG. 9 is an enlarged view typically showing a region B of FIG. 8.

Figure 10:
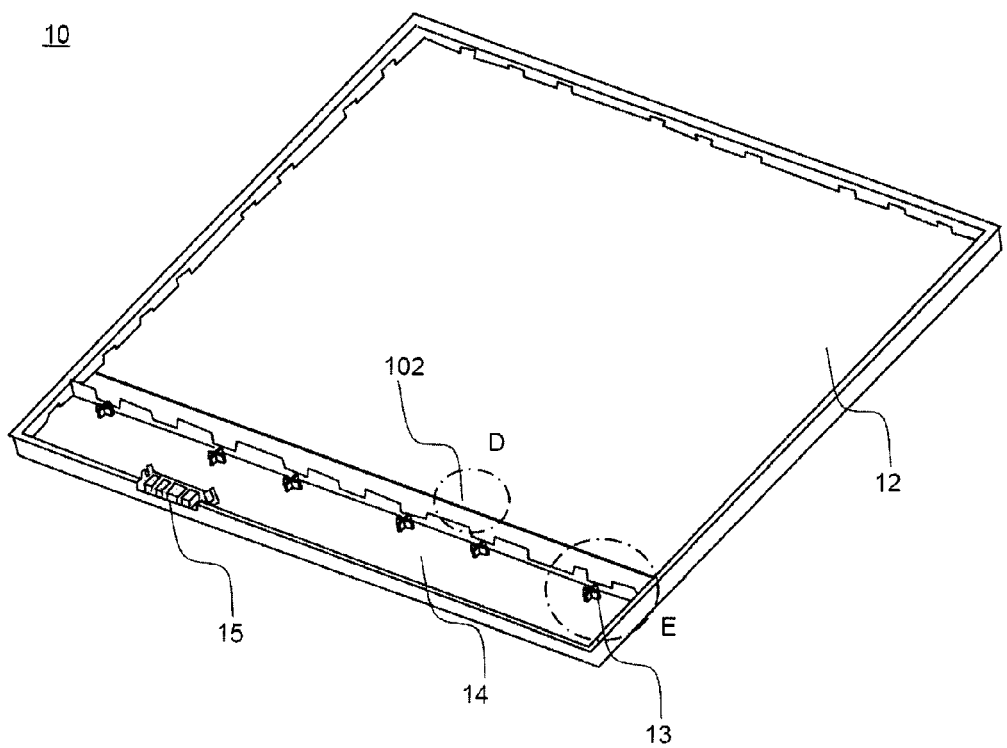
FIG. 10 is a perspective view of the lower case.

Referring to these drawings together with FIG. 10, the lower case 10 is partitioned into a battery cell mounting part 12, at which the battery cells 32 are disposed, and a protection circuit module mounting part 14, at which the protection circuit module 40 is disposed.

A partition wall 16 is formed at the interface between the battery cell mounting part 12 and the protection circuit module mounting part 14. Openings 18, through which the electrode terminals 34 of the battery cells 32 are exposed toward the protection circuit module 40, are formed at portions of the partition wall 16 corresponding to electrical connection regions between the electrode terminals 34 of the battery cells 32 and the protection circuit module 40.

The partition wall 16 has a height h sufficient to fully isolate the battery cell mounting part 12 and the protection circuit module 40 from each other. According to circumstances, a corresponding partition wall may be formed at the upper case (not shown) so as to achieve the above-mentioned isolation.

FIG. 10 is a perspective view typically showing the lower case, and FIGS. 11 to 14 are typical views showing various embodiments of movement preventing protrusions of FIG. 10.

Figure 11:
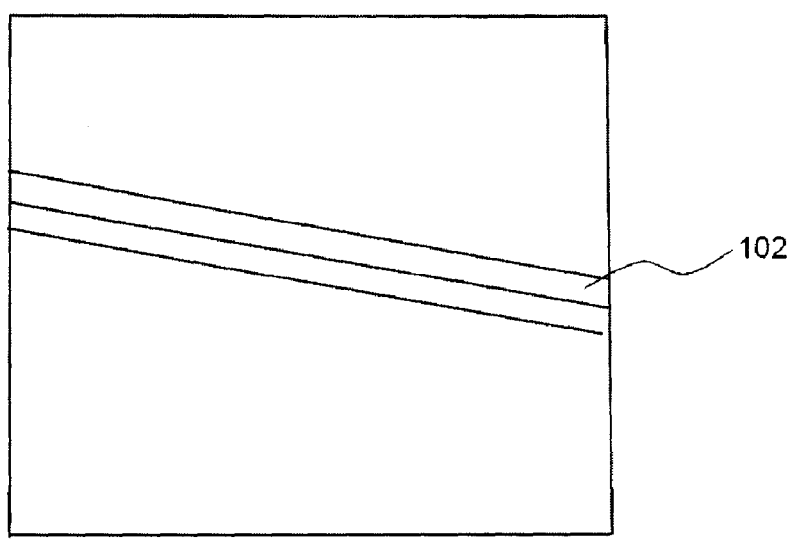
FIGS. 11 to 14 are typical views showing various embodiments of movement preventing protrusions of FIG. 10.
Figure 12:
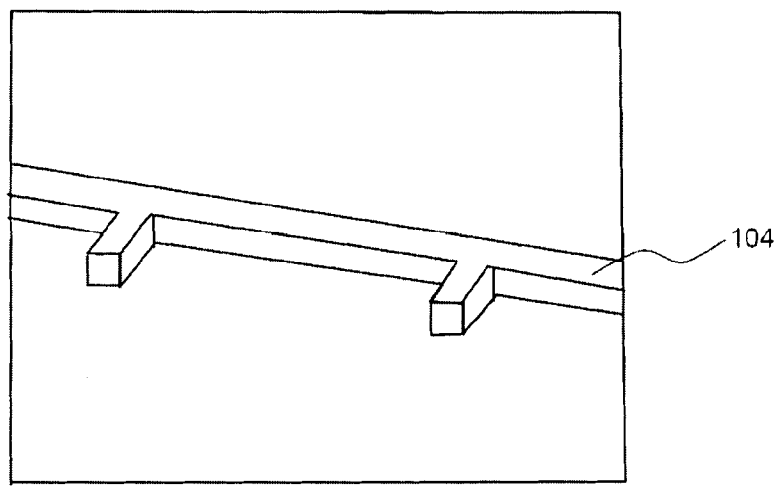

FIGS. 11 to 14 show various embodiments of movement preventing protrusions located at a region D of FIG. 10. Movement preventing protrusions 102 and 104 of FIGS. 11 and 12 are formed in the shape of ribs. The movement preventing protrusions 102 and 104 are continuously formed at the inside of the battery cell mounting part 12 of the lower case 10 at positions of the battery cell mounting part 12 of the lower case 10 corresponding to the end of the reinforcing member.

Figure 13:
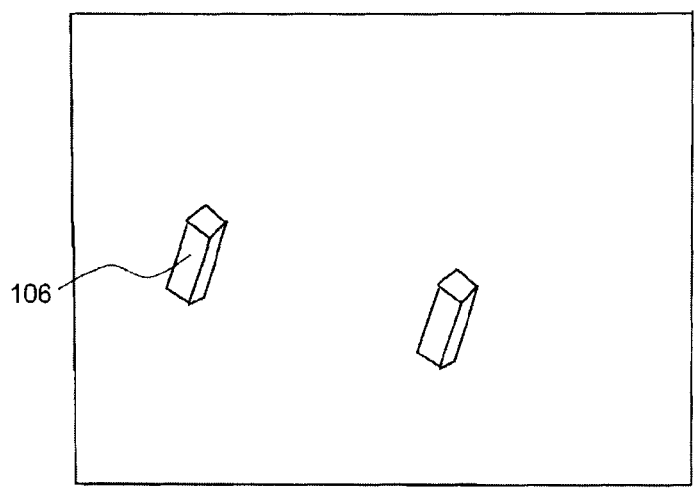
Figure 14:
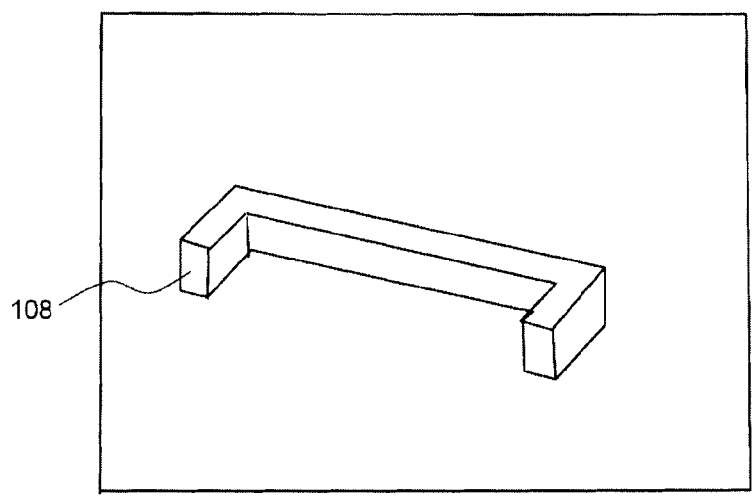

Movement preventing protrusions 106 and 108 of FIGS. 13 and 14 are formed in the shape of projections. The movement preventing protrusions 106 and 108 are discontinuously formed at the inside of the battery cell mounting part 12 of the lower case 10 at positions of the battery cell mounting part 12 of the lower case 10 corresponding to the end of the reinforcing member.

Figure 15:
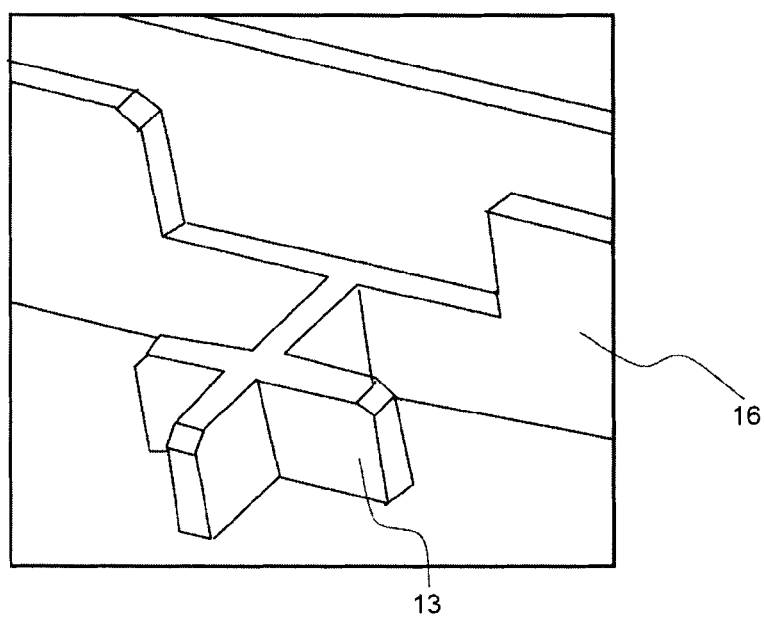
FIG. 15 is an enlarged view typically showing a region C of FIG. 8.
Figure 16:
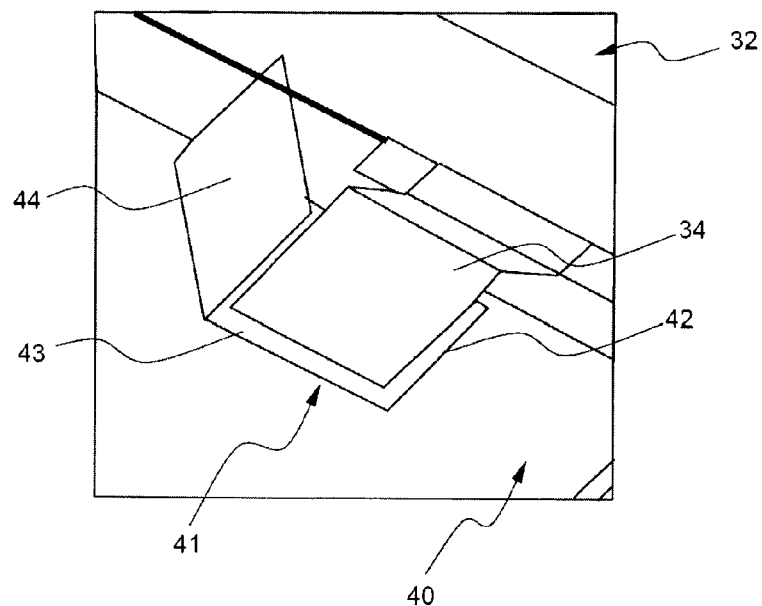
FIG. 16 is an enlarged view typically showing a region E of FIG. 10.

FIG. 15 is an enlarged view typically showing a region C of FIG. 8, and FIG. 16 is an enlarged view typically showing a region E of FIG. 10.

Referring to these drawings together with FIGS. 8 and 10, an external input and output terminal mounting part 15, at which external input and output terminals 46 to input electric current to the battery pack, to output electric current from the battery pack, and to transmit and receive information are disposed, are formed at the protection circuit module mounting part 14 of the lower case 10.

Also, support parts 13 to support the electrical connection regions between the electrode terminals 34 of the battery cells 32 and the protection circuit module 40 are formed on the lower case 10 in the shape of an upward cross-shaped protrusion at the partition wall 16 in a state in which the support parts 13 are connected to the partition wall 16. The support parts 13 appropriately support downward pressure applied by welding tips (not shown) to be located above the electrode terminals 34 of the battery cells 32 during resistance welding, thereby providing high welding force.

The protection circuit module 40 includes connection terminals 42 connected to the cathode terminals 34 of the battery cells 32 by resistance welding, metal wires (not shown) to electrically connect the connection terminals 42 to each other, and a protection circuit (not shown) to control the operation of the battery pack.

Each of the electrical connection regions C between the electrode terminals 34 of the battery cells 32 and the protection circuit module 40 is configured to have a structure in which a conductive plate 41 attached to a corresponding one of the connection terminals 42 of the protection circuit module 40 wraps a corresponding one of the cathode terminals 34 of the battery cells 32.

Also, the conductive plate 41, which may be a nickel plate, includes a first connection part 43 attached to the top of the corresponding connection terminal 42 of the protection circuit module 40 and a second connection part 44 attached to the top of the cathode terminal, which may be an aluminum terminal, of the corresponding battery cell 32.

Specifically, the conductive plate 41 is attached to the top of the corresponding connection terminal 42 of the protection circuit module 40 in an L shape. The conductive plate 41 is bent in a bracket shape in a state in which the cathode terminal 34 of the corresponding battery cell 32 is placed at the top of the first connection part 43 of the conductive plate 41, and then resistance welding is carried out from above the second connection part 44, which is a bent portion of the conductive plate 41.

Meanwhile, the external input and output terminals 46, which input electric current to the battery pack, output electric current from the battery pack, and transmit and receive information, are mounted at the front of the protection circuit module 40 in a depressed form.

Figure 17:
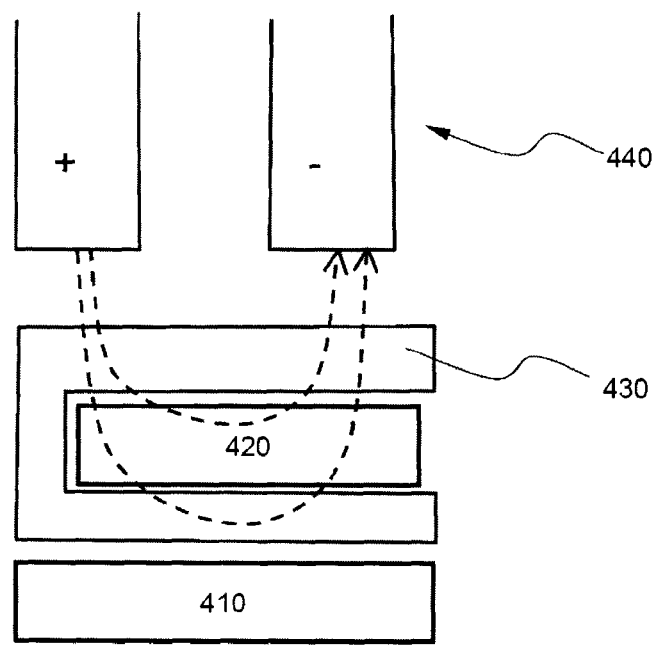
FIG. 17 is a typical view showing a resistance welding structure of the present invention.

FIG. 17 is a typical view showing a resistance welding structure of the present invention.

Referring to FIG. 17, electric current from a resistance welding rod 440 during resistance welding between a nickel plate 430 and an aluminum terminal 420 flows from the nickel plate 430, resistance of which is high, to the aluminum terminal 420, resistance of which is low, and flows back to the nickel plate 430. At this time, heat is generated from the interface between the aluminum terminal 420 and the nickel plate 430 due to resistance difference therebetween with the result that the resistance welding between the nickel plate 430 and the aluminum terminal 420 is easily achieved.

Figure 18:
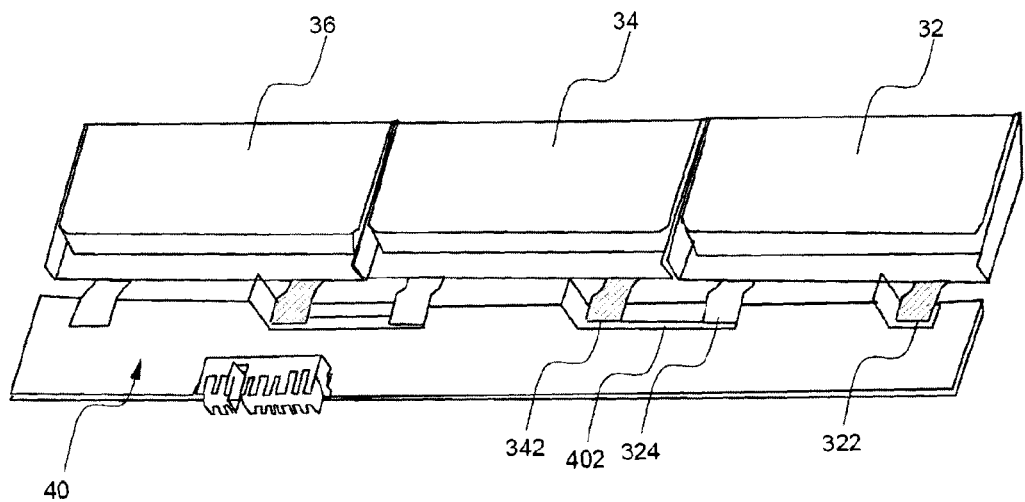
FIG. 18 is a partial perspective view showing a structure in which a plurality of pouch-shaped battery cells according to another embodiment of the present invention is electrically connected to each other.
Figure 19:
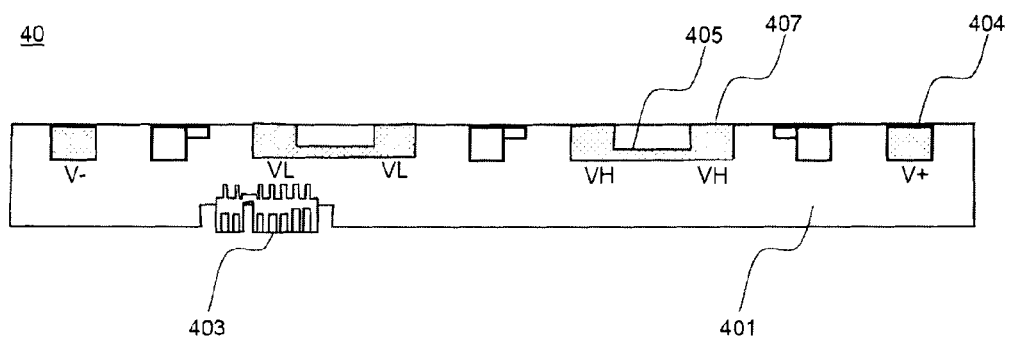
FIG. 19 is an enlarged plan view typically showing a protection circuit module (PCM) of FIG. 18.

FIG. 18 is a partial perspective view typically showing a structure in which a plurality of pouch-shaped battery cells according to another embodiment of the present invention is electrically connected to each other, and FIG. 19 is an enlarged plan view typically showing the PCM of FIG. 18.

Referring to these drawings, metal wires 402 to electrically connect battery cells 32, 34 and 36 to each other are formed at the top of the protection circuit module 40 in a structure in which an anode terminal 324 of the first battery cell 32 is connected in series to a cathode terminal 342 of the second battery cell 34.

Also, the protection circuit module 40 includes a PCM main body 401 having a protection circuit to control overcharge, overdischarge and overcurrent, connection terminals 404 and 407 formed at positions of the PCM main body 401 corresponding to the electrode terminals of the battery cells 32, 34 and 36 so as to directly electrically connect the battery cells 32, 34 and 36, metal wires 405 formed at the top of the PCM main body 401 to electrically connect the connection terminals 404 and 407 to each other, and an external input and output terminals 403 to input electric current to the battery pack, to output electric current from the battery pack, and to transmit and receive information, are mounted at the front of the PCM main body 401 in a depressed form.

[Industrial Applicability]

As is apparent from the above description, the battery pack according to the present invention includes two or more battery cells so as to provide high power and large capacity and is configured to have a structure in which the plate-shaped reinforcing members are mounted between the pack cases and the battery cell array. Consequently, it is possible to provide a battery pack in which mechanical strength of the pack cases is increased.

Also, the electrical connection regions between the cathode terminals of the battery cells and the protection circuit module are configured to have a structure in which the conductive plates attached to the tops of the respective connection terminals of the protection circuit module are welded so that the conductive plates wrap the respective cathode terminals of the battery cells. Consequently, it is possible to manufacture a battery pack exhibiting high weldability and having a compact structure.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack comprising:
    (a) a battery cell array comprising two or more battery cells, each of which has an electrode assembly of a cathode/separator/anode structure disposed in a battery case together with an electrolyte in a sealed state, arranged in a lateral direction in a same surface plane;
    (b) a protection circuit module (PCM) connected to an upper end of the battery cell array to control an operation of the battery pack;
    (c) a pack case in which the battery cell array and the protection circuit module are disposed,
    wherein the pack case comprises a lower case at which the battery cell array and the protection circuit module are disposed and an upper case to cover the lower case so as to fix the battery cell array and the protection circuit module in place,
    wherein the lower case is partitioned into a battery cell mounting part, at which the battery cells are disposed, and a protection circuit module mounting part, at which the protection circuit module is disposed, and a partition wall is formed at an interface between the battery cell mounting part and the protection circuit module mounting part, openings, through which electrode terminals of the battery cells are exposed toward the protection circuit module, being formed at portions of the partition wall corresponding to electrical connection regions between the electrode terminals of the battery cells and the protection circuit module, wherein the protection circuit module mounting part comprises support parts to support the electrical connection regions between the electrode terminals of the battery cells and the protection circuit module; and (d) a plate-shaped reinforcing member mounted between the pack case and the battery cell array to increase mechanical strength of the pack case.

2. The battery pack according to claim 1, wherein the pack case is formed of a plastic material or a sheet member, and the reinforcing member is formed of stainless steel (SUS) or a thin metal sheet.

3. The battery pack according to claim 2, wherein the sheet member wraps the battery cell array, the protection circuit module, and the reinforcing member.

4. The battery pack according to claim 2, wherein the sheet member is formed of a Nomex material.

5. The battery pack according to claim 1, wherein the reinforcing member is coated with an insulative material to achieve insulation between the reinforcing member and the battery cell array.

6. The battery pack according to claim 1, wherein the reinforcing member is bonded to a top and bottom of the battery cell array by an adhesive or a double-sided adhesive tape.

7. The battery pack according to claim 1, wherein the reinforcing member is provided at a part of an outer circumference thereof with a side wall having a size corresponding to a height of the battery cell array to prevent movement of the battery cell array.

8. The battery pack according to claim 7, wherein the side wall extends upward and/or downward from opposite sides and a lower end of the reinforcing member.

9. The battery pack according to claim 1, wherein a movement preventing protrusion to prevent movement of the reinforcing member and to fix the reinforcing member in place is formed at an inside of the pack case at a position of the pack case corresponding to an end of the reinforcing member.

10. The battery pack according to claim 1, wherein the protection circuit module comprises connection terminals connected to electrode terminals of the battery cells by resistance welding, metal plates to electrically connect the battery cells to each other, and a protection circuit to control the operation of the battery pack.

11. The battery pack according to claim 10, wherein metal wires to electrically connect the battery cells to each other are formed at a top of the protection circuit module.

12. The battery pack according to claim 10, wherein electrical connection regions between cathode terminals of the battery cells and the protection circuit module are configured to have a structure in which conductive plates attached to tops of the respective connection terminals of the protection circuit module are welded so that the conductive plates wrap the respective cathode terminals of the battery cells.

13. The battery pack according to claim 12, wherein each of the conductive plates comprises a first connection part attached to the top of a corresponding one of the connection terminals of the protection circuit module and a second connection part attached to a top of the cathode terminal of a corresponding one of the battery cells.

14. The battery pack according to claim 12, wherein each of the conductive plates is a nickel plate, and each of the cathode terminals of the battery cells is an aluminum terminal.

15. The battery pack according to claim 1, wherein the battery cell array comprises three battery cells.

16. The battery pack according to claim 1, wherein each of the battery cells is a pouch-shaped secondary battery.

17. The battery pack according to claim 1, wherein the external input and output terminals, which input electric current to the battery pack, output electric current from the battery pack, and transmit and receive information, are mounted at a front of the protection circuit module in a depressed form.

18. A laptop computer comprising a battery pack according to claim 1 as a power source.

* * * * *